United States Patent
Lin

(10) Patent No.: US 7,324,158 B2
(45) Date of Patent: Jan. 29, 2008

(54) VIDEO SIGNAL PROCESSING APPARATUS TO GENERATE BOTH PROGRESSIVE AND INTERLACE VIDEO SIGNALS

(75) Inventor: Tsu-Ping Lin, Hsin-Chu (TW)

(73) Assignee: Mediatek Inc., Hsin-Chu (TW)

( * ) Notice: Subject to any disclaimer, the term of this patent is extended or adjusted under 35 U.S.C. 154(b) by 678 days.

(21) Appl. No.: 10/884,980

(22) Filed: Jul. 7, 2004

(65) Prior Publication Data

US 2005/0008304 A1    Jan. 13, 2005

(30) Foreign Application Priority Data

Jul. 9, 2003    (TW) .............................. 92118778 A

(51) Int. Cl.
 *H04N 7/01*    (2006.01)
 *H04N 11/20*    (2006.01)

(52) U.S. Cl. ........................ 348/448; 348/446; 348/441

(58) Field of Classification Search ................ 348/448, 348/441, 446, 450, 453, 458, 459; H04N 7/01, H04N 11/20
See application file for complete search history.

(56) References Cited

U.S. PATENT DOCUMENTS

| | | | |
|---|---|---|---|
| 5,742,343 A * | 4/1998 | Haskell et al. ......... | 375/240.15 |
| 5,867,629 A | 2/1999 | Otsuka | |
| 5,874,005 A | 2/1999 | Amstrong | |
| 5,963,261 A | 10/1999 | Dean | |
| 5,991,494 A | 11/1999 | Otsuka | |
| 6,040,869 A | 3/2000 | Dischert | |
| 6,069,664 A | 5/2000 | Zhu et al. | |
| 6,072,531 A | 6/2000 | Shibano | |
| 6,144,412 A | 11/2000 | Hirano et al. | |
| 6,680,752 B1 * | 1/2004 | Callway et al. ............. | 348/448 |
| 2001/0016107 A1 | 8/2001 | Itani et al. | |
| 2002/0060746 A1 | 5/2002 | Yugami et al. | |

FOREIGN PATENT DOCUMENTS

| | | |
|---|---|---|
| EP | 1191785 A1 | 3/2002 |
| JP | 09172653 | 6/1997 |
| JP | 10285559 | 10/1998 |
| JP | 11041606 | 2/1999 |
| JP | 2000181418 | 6/2000 |
| JP | 2000217083 | 8/2000 |
| JP | 2001067042 | 3/2001 |
| JP | 2001231016 | 8/2001 |
| JP | 2001257996 | 9/2001 |
| JP | 2001359053 | 12/2001 |
| JP | 2002314949 | 10/2002 |

* cited by examiner

*Primary Examiner*—Sherrie Hsia
(74) *Attorney, Agent, or Firm*—Troxell Law Office, PLLC

(57) ABSTRACT

A video signal processing apparatus includes a main picture processor, an interlace recovering module and a video encoder. The main picture processor produces corresponding main picture signals based on video signals from a memory. The main picture signals are converted to progressive scan signals through a predetermined video signals processing. The interlace recovering module receives the progressive scan signals, retrieves the even portion and the odd portion of the progressive video signals alternately, and generates a set of interlace-scan signals. The video encoder receives both the progressive scan signals and the interlace scan signals and generates a set of progressive video signals and a set of interlace video signals to corresponding video display apparatuses. Thereupon, the video reproduction system can simultaneously provide both the progressive video signals and interlace video signals to the video display apparatuses.

20 Claims, 8 Drawing Sheets

VIDEO SIGNAL PROCESSING APPARATUS TO GENERATE BOTH PROGRESSIVE AND INTERLACE VIDEO SIGNALS

BACKGROUND OF THE INVENTION

1. Field of the Invention

The present invention relates to a video signal processing apparatus. More particularly, the present invention relates to generate both progressive and interlace video signals of the video signal processing apparatus.

2. Description of the Prior Art

Video displaying is usually achieved by continuously displaying the consecutive still video pictures or video images, which are then captured by human eyes to render a dynamic or a motion effect. Each video picture/image includes several scanning lines starting from the upper-left corner of the video picture/image. Take the well-known NTSC standard for an example, the format type for a video picture/image in the NTSC standard includes 525 scanning lines, among which approximately 480 scanning lines are effective, or so called effective scanning lines.

When a video display apparatus, like a TV, a projector or a monitor, is employed for video displaying, there are generally two kinds of scanning methods: interlace scanning method (interlace scan), and progressive scanning method (progressive scan). The interlace scanning method has been developed for a long time and is used more often. Most of the TV in the current market utilize interlace scanning method for video displaying. However, there is an increasing demand for progressive scanning. Therefore, some of the video display apparatuses are also designed to utilize progressive scanning. Most well-known format types for video displaying include: interlaced video (480i) of 525 total scanning lines and 480 effective scanning lines, interlaced video (1080i) of 1125 total scanning lines and 1080 effective scanning lines, progressive video (480p) of 525 total scanning lines and 480 effective scanning lines, and progressive video (720p) of 750 total scanning lines and 720 effective scanning lines.

In the interlace scanning method, the odd numbers of scanning lines, i.e. the first, the third, the fifth . . . , are first scanned. Usually it is also called the first field or "odd field". Then, the even numbers of scanning lines go on, i.e. the second, the fourth, the sixth, the eighth . . . . Usually it is also called the second field or "even field". Thus, the smooth video displaying is in fact formed by controlling the scanning lines to be displayed on the video display apparatus in a first-odd-and-then-even way, or in an odd-and-even alternative way.

As for the progressive scanning method, the scanning lines are displayed sequentially, i.e. the first, the second, the third, the fourth . . . to the end. They constitute so-called a "frame", and the rendered pictures are usually more refined and subtler. The scanning speed is thus twice as that of the interlace scanning method because the progressive scanning method displays twice the scanning lines in the same time period. The data amount for the progressive scan is also twice as much as that for the interlace scan. .

FIG. 1 is a block diagram of video signal processing apparatus 10 according to the prior art. The video signal processing apparatus 10 is generally designed in a single chip. The video signal processing apparatus 10 of the prior art processes the video signals 22 transmitted from an external video memory 20 to output interlace video signals 11 that can be displayed by a video display apparatus. The video signal processing apparatus 10 comprises an interlace format picture processor 12 and a TV encoder 14. The interlace format picture processor 12 reads the video signals 22, transmitted from the video memory 20, in compliance with the interlace scanning method, and then it further transmits the signals into the TV encoder 14 to perform low-pass filtering and to adjust chrominance, brightness and contrast. The interlace format signals are then encoded into interlace signals 11 that are in compliance with the video standard of the video display apparatus.

FIG. 2 is a schematic diagram in which the interlace video signal 11 in FIG. 1 is transformed into a progressive video signal 31. If the progressive video display apparatus is to perform video displaying in a progressive scanning way, the inputted video signals have to be the corresponding progressive video signal 31. In the prior art, the video signal processing apparatus 10 utilizes an external interlace-to-progressive transforming IC circuit 13 to transform the interlace video signal 11 into the progressive video signal 31. More specifically, the signal transformation is performed by inserting a scanning line, either by means of interpolation or simulation, between two consecutive scanning lines of the interlace video signals 11. In this way, the interlace field signals can be interpolated or simulated as the progressive frame signal, and the interlace video signals 11 can therefore be transformed into the progressive video signal 31. Because the interlace-to-progressive transforming IC circuit 13 needs to be designed on another chip outside the video signal processing apparatus 10, the production cost is consequently increased. The aforementioned method is restricted by cost in practical application.

FIG. 3 is a block diagram of the prior art video signal processing apparatus 30 for generating a progressive video signal 31. The video signal processing apparatus 30 of the prior art, designed on a single chip, is used for generating progressive video signals 31.

This video signal processing apparatus 30 has the same function as the video signal processing apparatus 10. Furthermore, it processes the video signals 22 in compliance with the progressive scanning method. Because the picture processor 32 has the built-in functions of interpolation and/or simulation, after reading the video signals 22, it generates the corresponding frame signals in compliance with the progressive scanning method. Besides, the TV encoder 34 can encode the signals, which come from the picture processor 32, to be the progressive video signals 31 in compliance with the video standard of the video display apparatus.

FIG. 4 is a block diagram in which the video signal processing apparatus 30 of FIG. 3 generates interlace video signals 11. It is worthy to mention that the video signal processing apparatus 30, with the same function as the video signal processing apparatus 10, can output the interlace video signals 11 on its own or independently. When the video signal processing apparatus 30 is used for generating the interlace video signals 11, the picture processor 32, using the same way as the picture processor 12 of FIG. 1, reads the video signals 22 by disabling or without using the function of interpolation and/or simulation. That is, the picture processor 32 of the video signal processing apparatus 30 has two modes, the progressive mode/format and the interlace mode/format. Therefore, the video signal processing apparatus 30, depending on different situations, alternatively outputs progressive video signals 31 or interlace video signals 11.

Comparing the embodiment of the video signal processing apparatus 30 of FIG. 3 and FIG. 4 with the embodiment of the video signal processing apparatus 10 of FIG. 2, the video signal processing apparatus 30 generates the progressive video signal 31 without utilizing the external interlace-to-progressive transforming IC circuit 13, so the cost of production can be reduced. However, the video signal processing apparatus 30 can only display the progressive video signal 31 or the interlace video signal 11 alternatively, but not both together.

SUMMARY OF THE INVENTION

The objective of the present invention is to provide a video signal processing apparatus/video playback system that is designed on single chip, simple, and relatively cheap, and that it is also able to output both progressive video signals and interlace video signals to the video display apparatus, like TV, projector etc., for video displaying purpose.

The present invention is a video signal processing apparatus/video playback system for generating both a progressive video signal and an interlace video signal to at least one video display apparatus. The video signal processing apparatus/video playback system comprises a main picture processor, an interlace video signal generating module and a video encoder. The interlace video signal generating module comprises a luminance line buffer, at least one chroma line buffer, and a controlling circuit. According to video signals transmitted from a video memory, the main picture processor is used for generating a corresponding progressive main picture signal. A progressive signal stream is further generated from the progressive main picture signal via a predetermined video processing procedure. The interlace video signal generating module is used for receiving the progressive signal stream and for selectively storing the progressive signal stream in an odd and even alternative way into line buffers, in order to reconstruct an interlace signal stream. The video encoder is used for encoding, according to the video standard of the video display apparatus, the progressive signal stream and the interlace signal stream respectively into progressive video signals and the interlace video signals, to comply with the video standard of the video display apparatus. In this way, the video signal processing apparatus outputs both the progressive video signals and the interlace video signals to the corresponding video display apparatus for video displaying.

Under the traditional structure of the single chip design in the prior art, the present invention further introduces an interlace video signal generating module in the video signal processing apparatus. This enables the video signal processing apparatus of the present invention to output both the progressive video signals and the interlace video signals without an external circuit, such as the interlace-to-progressive transforming IC circuit 13 in the prior art. Without the external circuit, the present invention is capable of reducing the cost of production. The video signal processing apparatus, like DVD player, that utilizes the video signal processing apparatus of the present invention is able to output both the progressive video signals and the interlace video signals with most economical benefits at the same time. Therefore, when the DVD player needs to output video signals to two different apparatuses, such as a traditional TV that can only accept interlace video signals and another, like projector or high-level TV, that can accept progressive video signals, the two different apparatuses are able to achieve their best performance at the same time.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 5:
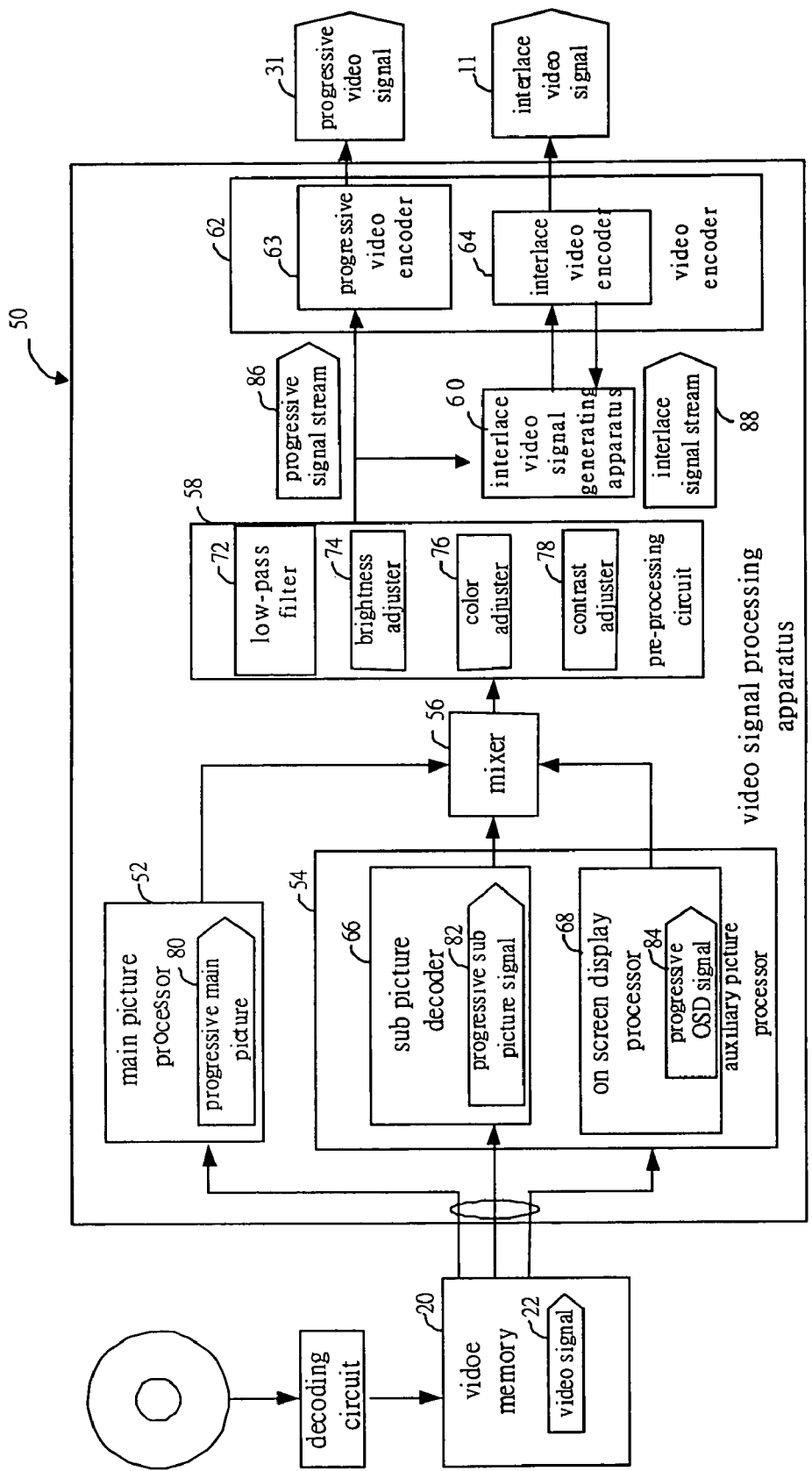
FIG. 5 is a block diagram of the video signal processing apparatus of the present invention.

FIG. 5 is a block diagram of the video signal processing apparatus 50 of the present invention. The video signal processing apparatus 50 has a main picture processor 52, an auxiliary picture processor 54, a mixer 56, a pre-processing circuit 58, an interlace video signal generating module 60 and a video encoder 62. The auxiliary picture processor 54 has a sub picture decoder 66 and an on screen display, OSD, processor 68. The pre-processing circuit 58 has a low-pass filter 72, a brightness adjuster 74, a color adjuster 76 and a contrast adjuster 78. The video signal processing apparatus 50 provides both a progressive video signal 31 and an interlace video signal 11 to at least one video display apparatus for video displaying.

As shown in FIG. 5, the main picture processor 52 generates a corresponding progressive main picture signal 80 according to the video signals 22 transmitted from a video memory 20. If the video signals 22 are interlace video signals, the main picture processor 52 will perform interpolation and/or simulation on the consecutive scanning lines in the field signals, so as to generate the progressive main picture signal 80. If the video signals 22 are progressive video signals, the main picture processor 52 generates the progressive main picture signals without the procedure of interpolation and/or simulation. The progressive main picture signals 80 further include the video data of the main picture to be displayed. The progressive main picture signals 80 generate a progressive signal stream 86 via a predetermined video processing procedure. The progressive signal stream 86 comprises plural frame signals, and the frame signals comprise plural scanning lines. The predetermined video processing procedure is performed by an auxiliary picture processor 54, a mixer 56 and pre-processing circuit 58.

The auxiliary picture processor 54 has a sub picture decoder 66 and an on screen display, OSD, processor 68. The sub picture decoder 66 decodes the video signals 22 to be corresponding progressive sub picture signals 82. The on screen display processor 68, according the video signals 22, generates corresponding progressive OSD signals 84. The progressive sub picture signals 82 include the video data of the sub picture, e.g. subtitles, logo . . . etc., which can be superimposed on the main picture. The progressive OSD signals 84 includes the video data of the On Screen Display Menu 'OSD Menu, to facilitate and assist the operation of the video signal processing apparatus 50. The mixer 56 performs video signals mixing on the progressive sub picture signals 82, the progressive OSD signals 84, and the progressive main picture signals 80, and those mixed signals are further transmitted into the pre-progressing circuit 58 for video processing and adjusting.

In FIG. 5, the pre-processing circuit 58 has a low-pass filter 72, a brightness adjuster 74, a color adjuster 76, and a contrast adjuster 78. After the progressive main picture signals 80 are mixed with other signals, the pre-processing circuit 58 further performs low-pass filtering and adjusting of all chrominance, brightness and contrast to generate the progressive signal stream 86.

Figure 9:
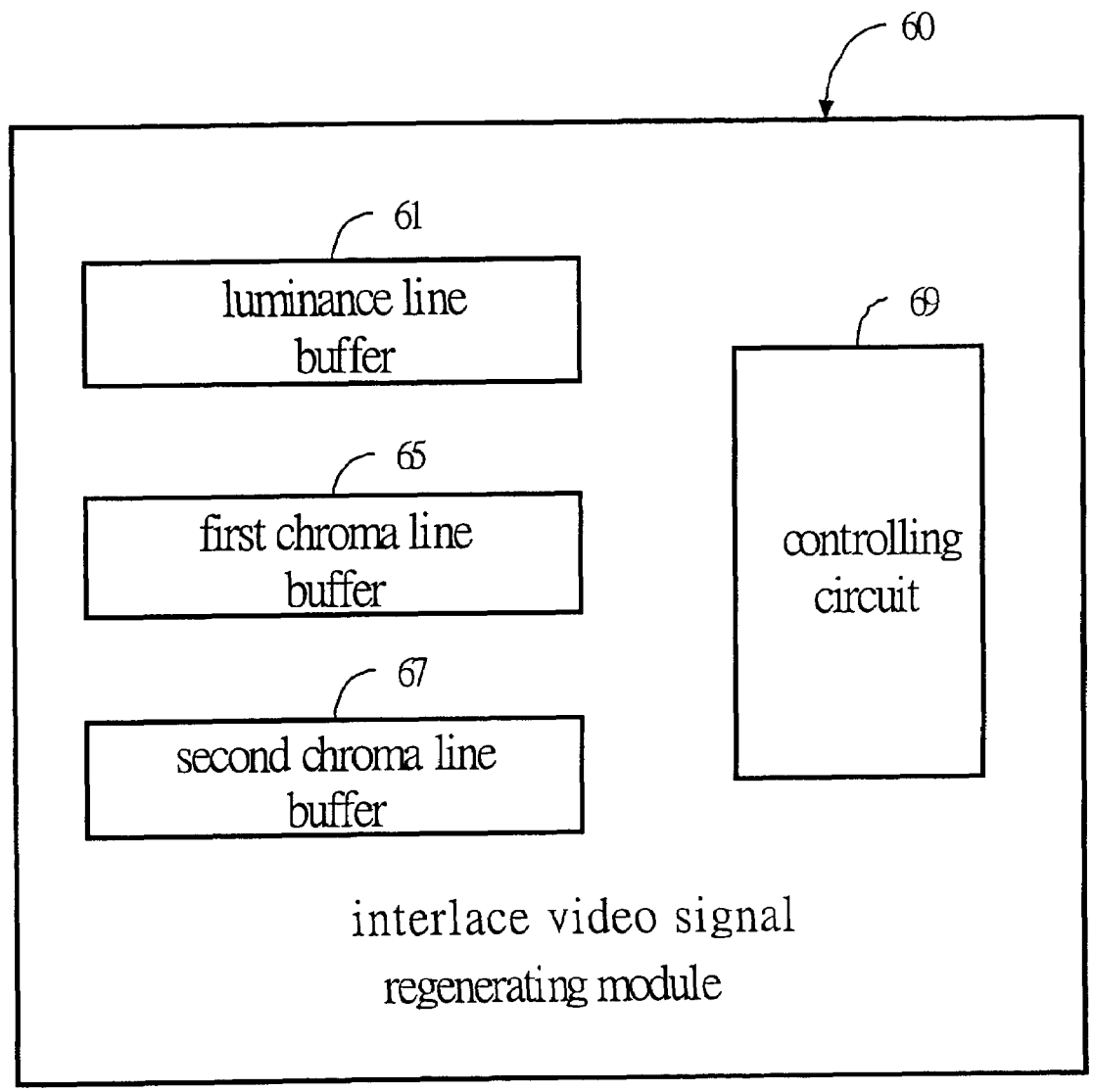
FIG. 9 is a schematic diagram of the interlace video signal generating module of the present invention.

The interlace video signal generating module 60 is capable of receiving the progressive signal stream 86 and for selectively storing the progressive video signals in an odd and even alternative way into line buffers, in order to reconstruct or regenerate an interlace signal stream 88. FIG. 9 is a schematic diagram of the interlace video signal generating module 60 of the present invention. The embodiment employs the displaying format of luminance and chrominance, wherein Y represents luminance value, and C, comprising CB and CR that respectively represents the first and the second chrominance, represents chrominance. Therefore, the interlace video signal generating module 60 includes a luminance line buffer 61 for temporarily storing the data of luminance, the first chrominance line buffer 65 and the second chrominance line buffer 67 for temporarily storing data of chrominance, and a controlling circuit 69 for controlling the access of the data of luminance and chrominance. There are three sampling formats defined in MPEG-2; they are 4:2:0, 4:2:2, and 4:4:4, which respectively represent three different sampling rates of chrominance. This is known in the prior art for the industry and no further detail is here explained. Thus, the interlace video signal generating module 60 can accommodate one or two chrominance line buffers for storing the chrominance data.

As shown in FIG. 5, the video encoder 62 has a progressive video encoder 63 and an interlace video encoder 64. The progressive video encoder 63 is capable of encoding the progressive signal stream 86 to be the progressive video signals 31, and the interlace video encoder 64 is capable of encoding the interlace signal stream 88 to be the interlace video signals 11, all in compliance with the video standard of the video display apparatus. In this way, the video signal processing apparatus is capable of outputting both the progressive video signal 31 and the interlace video signal 11 together to a corresponding video display apparatus or plural video display apparatuses for video displaying purpose.

Figure 1:
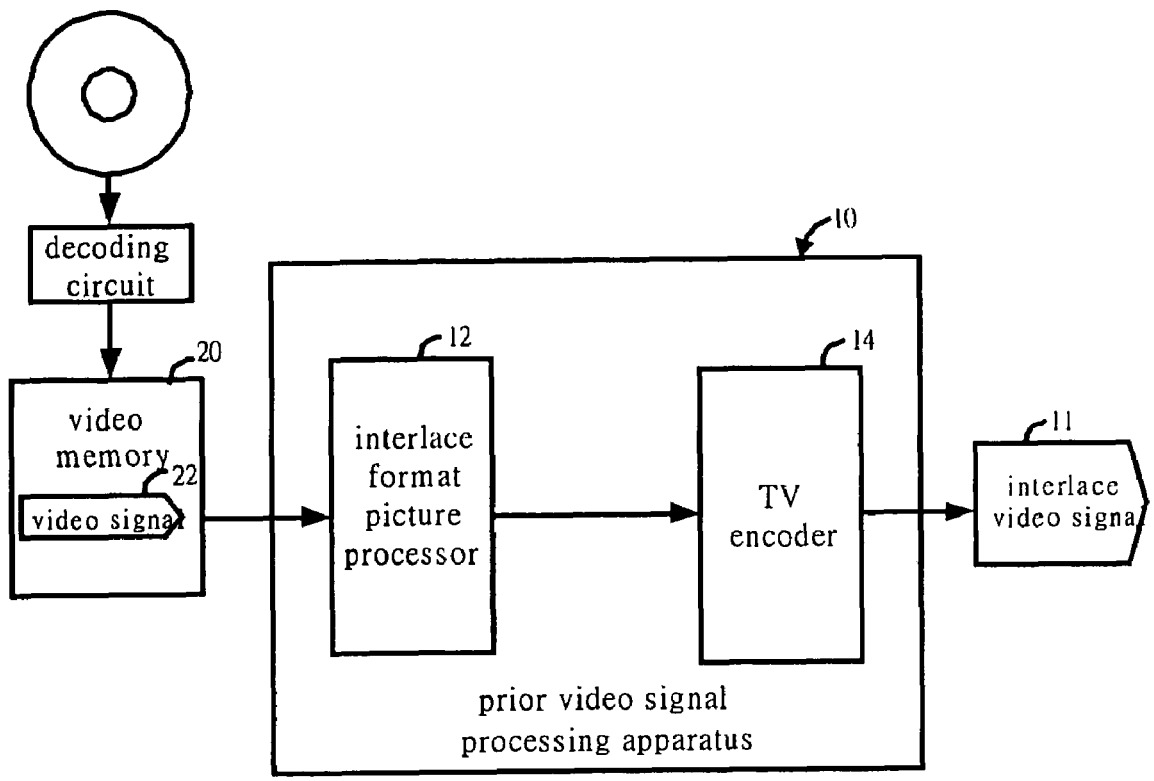
FIG. 1 is a block diagram of video signal processing apparatus according to the prior art.
Figure 2:
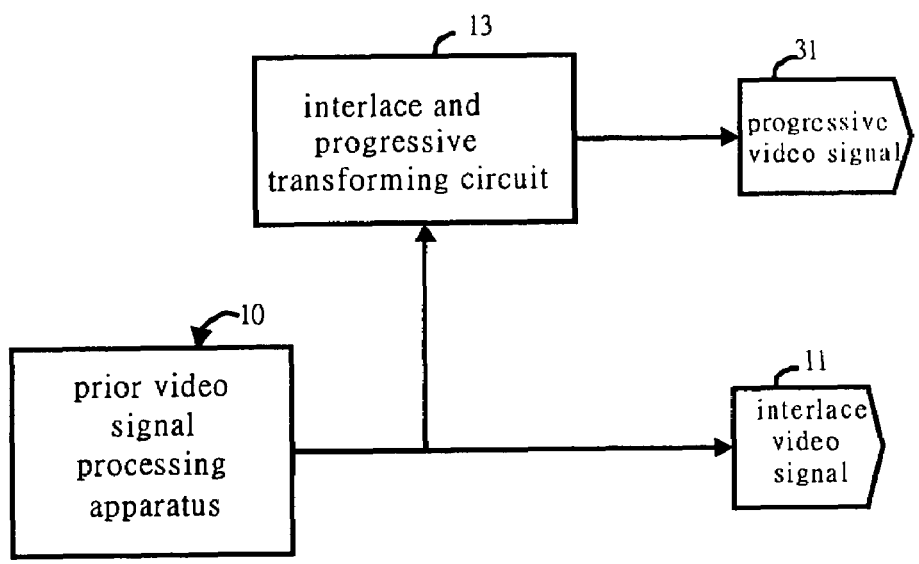
FIG. 2 is a schematic diagram in which an interlace video signal in FIG. 1 is transformed into a progressive video signal.
Figure 3:
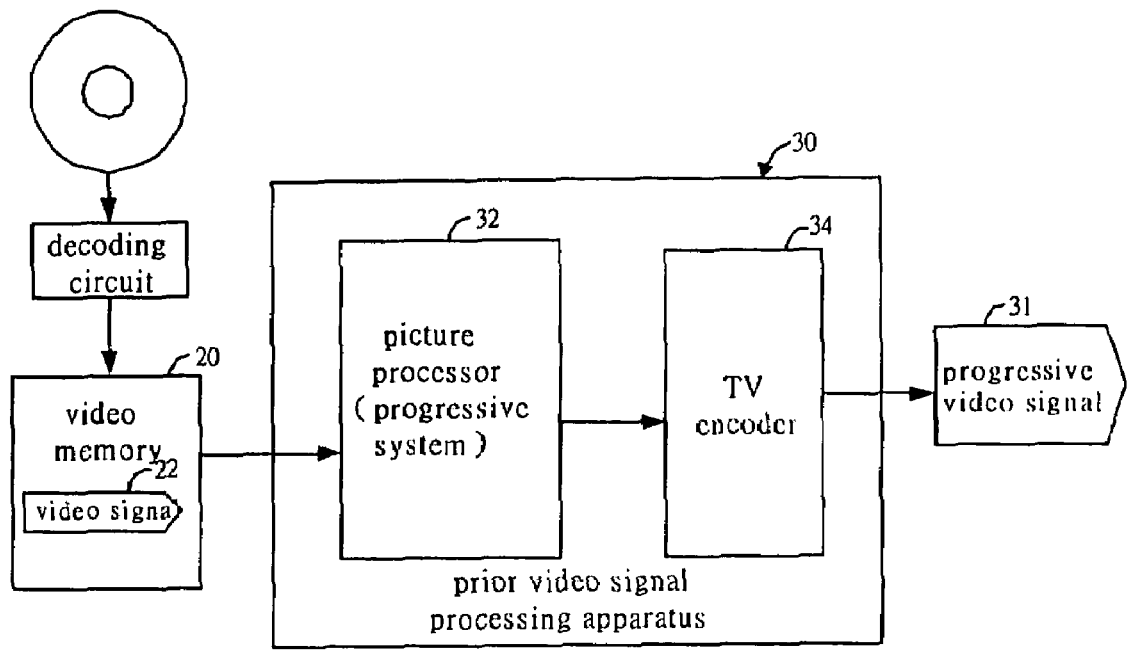
FIG. 3 is a block diagram of the video signal processing apparatus of the prior art for generating a progressive video signal.
Figure 4:
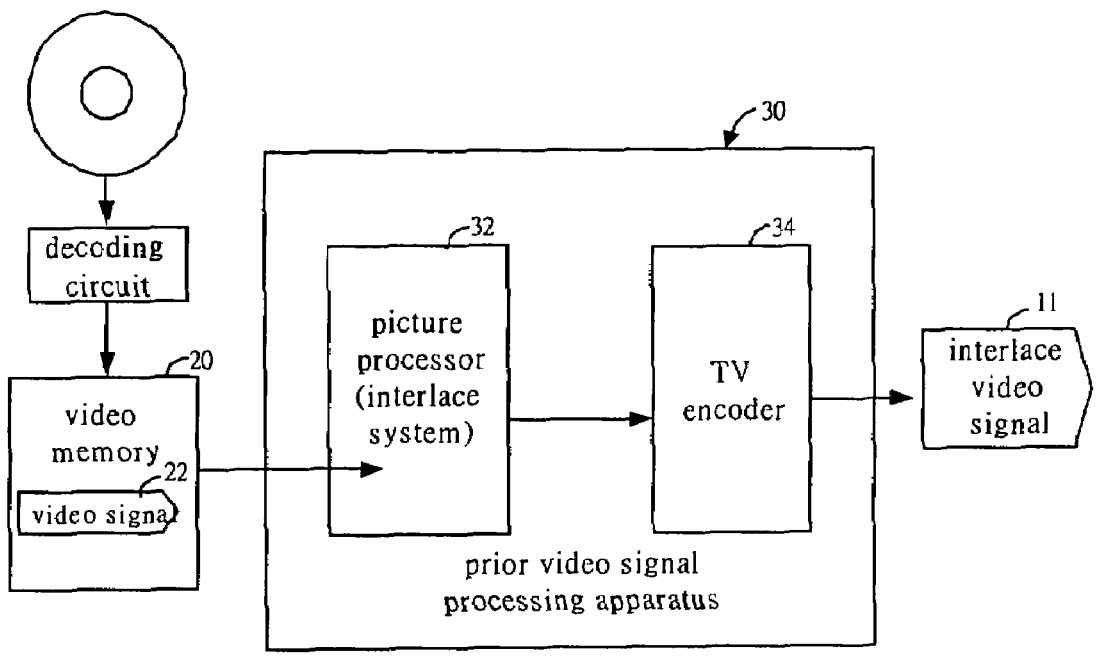
FIG. 4 is a block diagram in which the video signal processing apparatus of FIG. 3 generates interlace video signals.

It has to be specifically mentioned that the so-called "together" in the context of the present invention is referring to the fact that the progressive video signals 31 and the interlace video signals 11 can be both generated at the signal transforming procedure, but not necessarily simultaneous. That is, no matter whether the progressive video signals 31 and the interlace video signals 11 can be generated at the same time, all the video signal processing apparatuses that can have both signals generated together to the video display apparatus for video displaying purpose should be construed as being covered by the metes and bounds of the appended claims of the present invention. According to the video signal processing apparatus 50 of FIG. 5, all the main picture processor 52, the sub picture decoder 66, and the on screen display processor 68 are in compliance with the progressive scanning method. Compared to the video signal processing apparatus 30 of the prior art of FIG. 3 and FIG. 4, in which the video signal processing apparatus 30 is only capable of outputting the progressive video signals 31 or the interlace video signals 11 alternatively but not both together, video signal processing apparatus 50 of the present invention utilizes an interlace video signal generating module 60 to selectively store the progressive signals in an odd and even alternative way, and it is able to output both the progressive video signal 31 and the interlace video signal 11 together.

Figure 6:
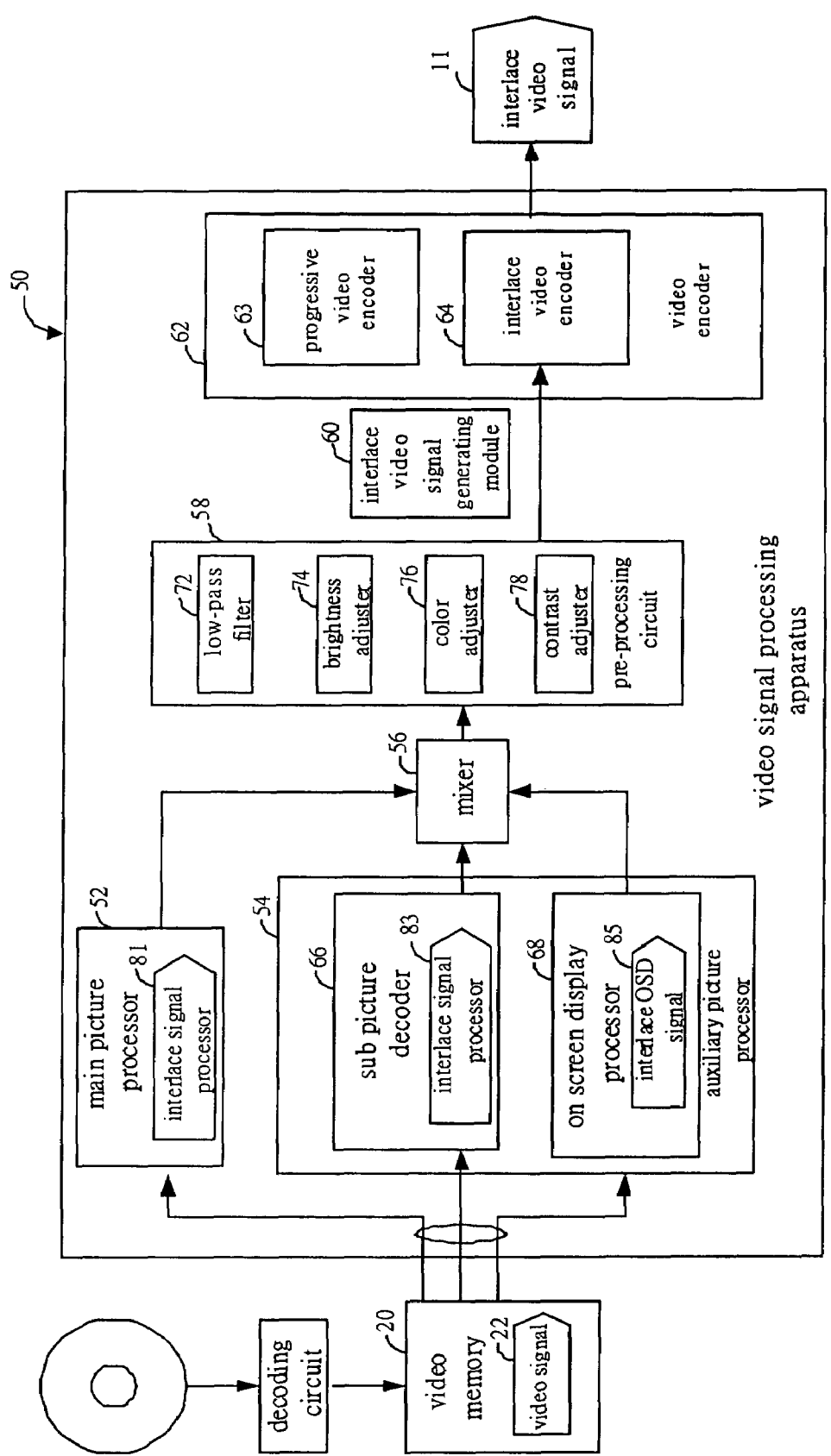
FIG. 6 is a block diagram in which the video signal processing apparatus of FIG. 5 only outputs interlace video signals.

FIG. 6 is a block diagram in which the video signal processing apparatus 50 of FIG. 5 only outputs the interlace signals 11. The video signal processing apparatus 50 not only can output the progressive video signals and the interlace video signals 11 together, but it can output the interlace video signals 11 alone, if necessary. When the video signal processing apparatus 50 outputs the interlace video signals 11 alone, the main picture processor 52 does not perform the interpolation and/or simulation operation on the inputted consecutive scanning lines. In this specific case, the main picture processor 52, the sub picture decoder 66 and the OSD processor 68 all function in compliance with the interlace scanning method, and an interlace main picture signal 81, an interlace sub picture signal 83 and an interlace OSD signal 85 are selectively generated based on the video signals 22. In this embodiment, similar to the prior art of FIG. 4, the interlace video signal generating module 60 and the progressive video encoder 63 do not perform any function.

Figure 7:
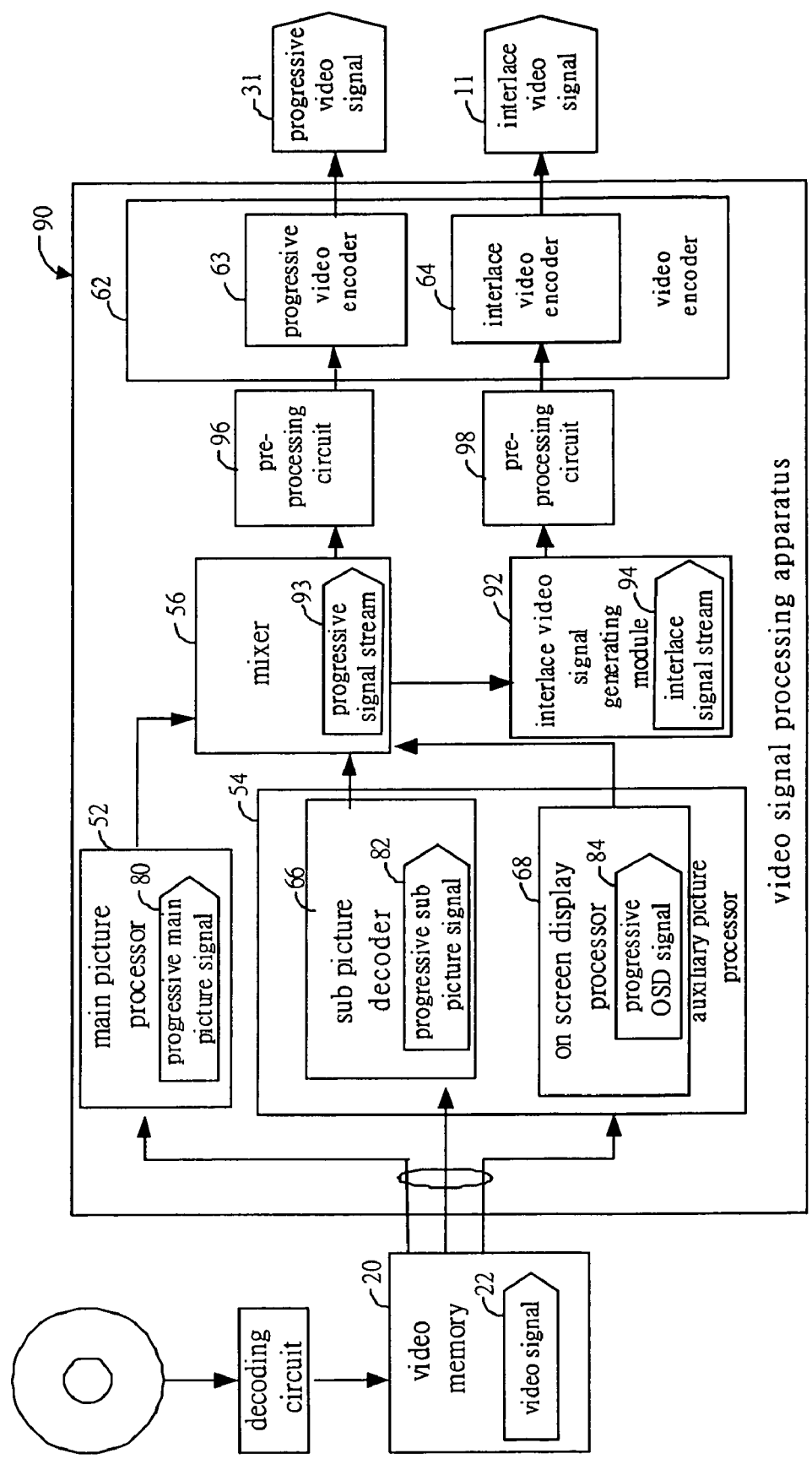
FIG. 7 is block diagram of the video signal processing apparatus of the second embodiment according to the present invention.

FIG. 7 is a block diagram of the video signal processing apparatus 90 of another embodiment according to the present invention. The main difference between the video signal processing apparatus 90 of FIG. 7 and the video signal processing apparatus 50 of FIG. 5 is the circuit allocation of the interlace video signal generating module 92. The interlace video signal generating module 92 is used for receiving the progressive signal stream 93 transmitted from the mixer 56 and for selectively storing the interlace video signals in an odd and even alternative way to generate an interlace signal stream 94.

In FIG. 7, the progressive signal stream 93 and the interlace signal stream 94, via the pre-processing circuit 96 and the pre-processing circuit 98 respectively, go through low-pass filtering and adjustment in chrominance, brightness and contrast. Then, the progressive video encoder 63 encodes the progressive signals stream 93 to be the progressive video signals 31, and the interlace video encoder 64 encodes the interlace signal stream 94 to be the interlace video signals 11, both to be in compliance with the video standard of the video display apparatus.

Comparing the embodiment of FIG. 5 with the embodiment of FIG. 7, the embodiment of FIG. 5 performs low-pass filtering and adjusts chrominance, brightness and contrast before the interlace video signal generating module 60 generates the interlace signal stream 88. In this configuration, the use of one pre-processing circuit can be reduced and saved. The progressive video encoder 63 and the interlace video encoder 64 are respectively designed for the video encoding that requires separate signal process.

Figure 10:
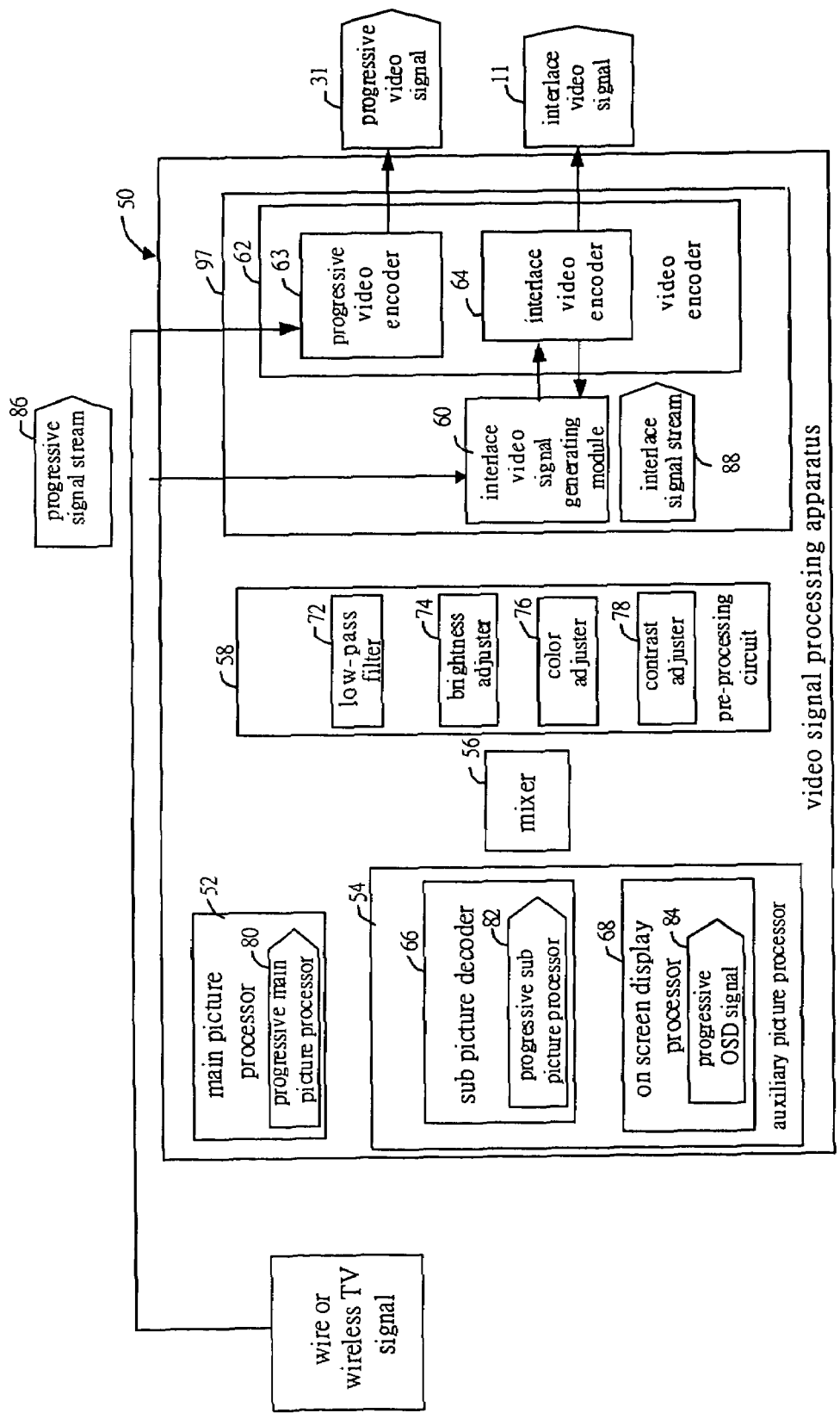
FIG. 10 is a schematic diagram of the video signal processing apparatus of FIG. 5 to utilize an external progressive signal stream.

FIG. 10 is a schematic diagram of the video signal processing apparatus 50 of FIG. 5 to utilize an external progressive signal stream 86. In the aforementioned embodiment, the video signal processing apparatus 50 is used for playing video data stored in the video storage medium, like VCD, DVD . . . etc. Referring to FIG. 10, the video signal processing apparatus 50 of the present invention can further utilize an external progressive signal stream 86 to generate both a progressive video signal 31 and an interlace video signal 11. In general, the external progressive signal stream 86 may come from cable and/or wireless TV signals of high-level TV sets. For example, in order to ensure the high quality images in sport video displaying, some sport programs employ the progressive signal stream 86 with larger data capacity. Furthermore, many cities and countries are planning to change the standard of wireless TV signals to be the progressive video format, so as to be in compliance with the video display apparatuses that have the progressive scan function. In this embodiment, the interlace video signal generating module 60 and the video encoder 62 of the video signal processing apparatus 50 can be regarded as a progressive and interlace video signal apparatus 97. While reading the progressive signal stream 86, the interlace video signal generating module 60 can be employed to generate the interlace signal stream 88. The video encoder 62 can then be utilized to encode the two signal streams 86 and 88 to generate the interlace video signals 31 and the progressive video signals 11.

Figure 8:
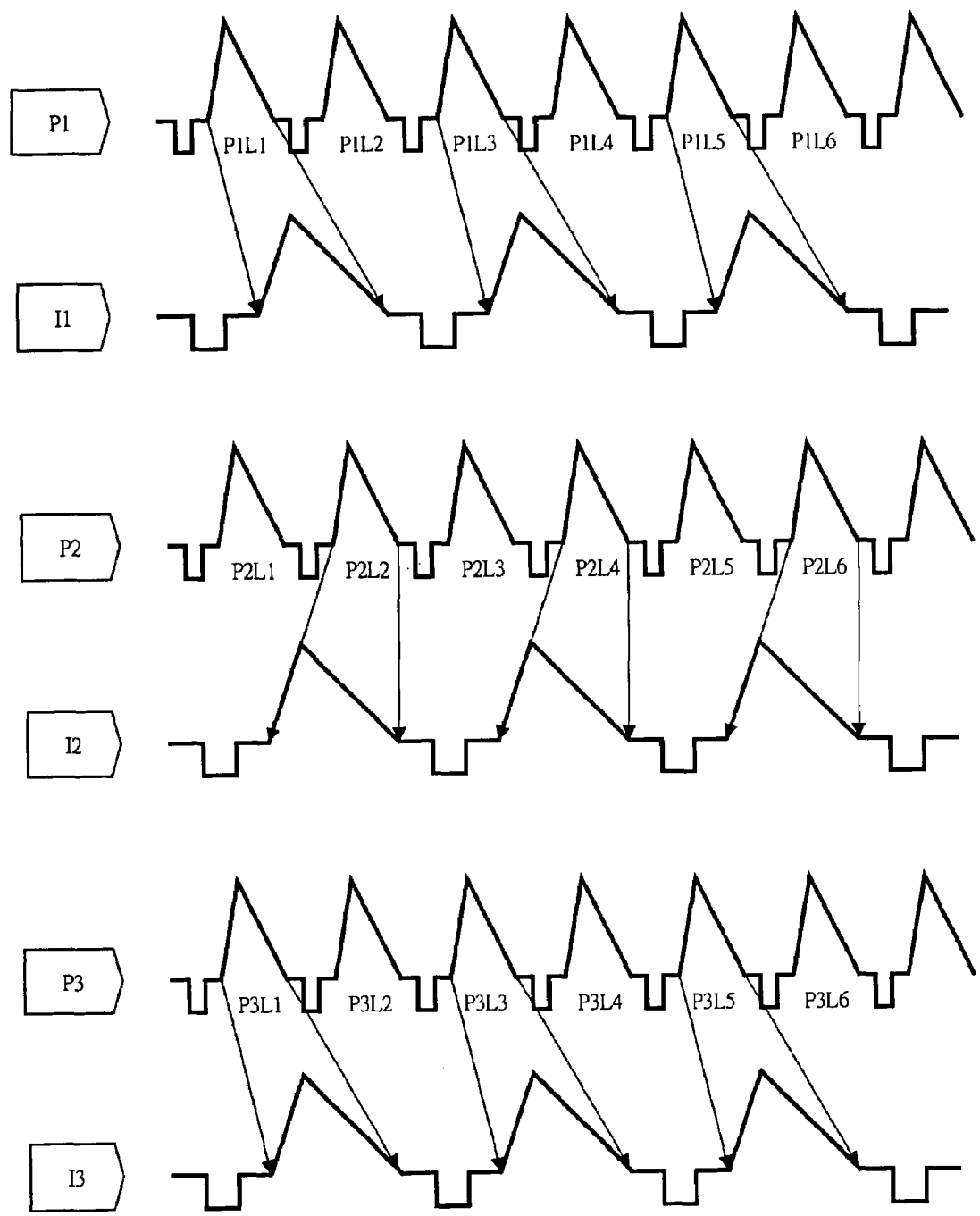
FIG. 8 is a schematic diagram of illustrating the selective storage in the odd and even alternative way by the interlace video signal generating module 60 in FIG. 5.

In FIG. 8, it is shown a schematic diagram of illustrating the selective signal storage in an odd and even alternative way by the interlace video signal generating module 60 in FIG. 5. P1 signal represents the progressive video signals to constitute a video picture. The interlace video signal generating module 60 retains the odd scanning lines, such as P1L1, P1L3, P1L5 . . . etc, of P1, but discards the even scanning lines, such as P1L2, P1L4, P1L6 . . . etc, of P1 signal. Those retained signals will be stored into one or plural line buffers in the interlace video signal generating module 60. Because the frequency of the progressive scanning signal is twice as fast as that of the interlace scanning signal, the interlace video signal generating module 60 outputs the stored signals at half of the P1 frequency to generate the interlace video signals 11. The above description can be regarded as the signal or data transformation in one video picture. For the next video picture, the interlace video signal generating module 60 retains the even scanning lines, such as P2L2, P2L4, P2L6 . . . etc, of P2 signal, but discards the odd scanning lines, such as P2L1, P2L3, P2L5 . . . etc, of P2 signal. Those retained signals will be stored into one or plural line buffers in the interlace video signal generating module 60. The interlace video signal generating module 60 outputs the stored signals at half of the P2 frequency to generate the interlace video signals 12.

The aforementioned signal retain-and-discard process repeats itself. That is, on the next video picture, the interlace video signal generating module 60 retains the odd scanning lines, such as P3L1, P3L3, P3L5 . . . etc, of P3 signal, but discards the even scanning lines, such as P3L2, P3L4, P3L6 . . . etc, of P3 signal. This is the method according to the present invention to utilize the interlace video signal generating module 60 for selectively storing the progressive video signals in odd and even alternative way for reconstructing or regenerating the interlace video signals. According to the disclosed method, the progressive signal stream 86 can be transformed into the interlace signal stream 88 in a simple and cost-effective way. Summarizing the above, under the single chip design structure of the prior art, the present invention further includes an interlace video signal generating module in the video signal processing apparatus. This enables the video signal processing apparatus of the present invention to achieve the design purpose of outputting both the progressive scan signals and the interlace scan signals without an external circuit. Without the external circuit, the present invention is capable of reducing the cost of production while still achieves its intended design purpose.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A video signal processing apparatus for generating both a progressive video signal and an interlace video signal to at least one video display apparatus, the video signal processing apparatus comprising:
   a main picture processor, for generating a corresponding progressive main picture signal according to video signals transmitted from a video memory, a progressive signal stream being further generated from the progressive main picture signal via a predetermined video processing procedure;
   an interlace video signal generating module, comprising at least one line buffer, for receiving the progressive signal stream and selectively storing the progressive signal stream in an odd and even alternative way to generate an interlace signal stream; and
   a video encoder, for encoding, according to a video standard of the video display apparatus, the progressive signal stream and the interlace signal stream respectively to be the progressive video signal and the interlace video signal in compliance with the video standard of the video display apparatus;
   whereby the video signal processing apparatus provides both the progressive video signal and the interlace video signal to the video display apparatus for video displaying.

2. The video signal processing apparatus of claim 1, wherein the video signal processing apparatus comprises an auxiliary picture processor and a mixer, the auxiliary picture processor comprises:
   a sub picture decoder, for decoding the video signals in the video memory to corresponding progressive sub picture signals; and
   an on screen display (OSD) processor, for generating corresponding progressive OSD signals based on the video signals in the video memory;
   wherein the mixer performs signal mixing on the progressive sub picture signals, the progressive OSD signals and progressive main picture signals.

3. The video signal processing apparatus of claim 1, wherein the video signal processing apparatus further comprises a pre-processing circuit for performing video signal processing and adjusting on the incoming signals, and the pre-processing circuit comprises a low-pass filter, a brightness adjuster, a color adjuster and a contrast adjuster.

4. The video signal processing apparatus of claim 3, wherein the predetermined video processing procedure is to have the progressive main picture signals mixed by the mixer, and processed and adjusted by the pre-processing circuit.

5. The video signal processing apparatus of claim 1, wherein the video encoder comprises a progressive video encoder and an interlace video encoder.

6. The video signal processing apparatus of claim 5, wherein the interlace video encoder further reads out the stored signals at half of the frequency of the progressive signal stream to generate the interlace signal stream.

7. The video signal processing apparatus of claim 1, wherein the progressive signal stream comprises plural frame signals, and the frame signals comprise plural scan signals.

8. The video signal processing apparatus of claim 7, wherein selectively storing the progressive signal stream in an odd and even alternative way means to perform the following signal processing step on a consecutive first and second frame signal:

storing only the odd scan signals in the first frame signal, and storing only the even scan signals in the second frame signal.

9. The video signal processing apparatus of claim 7, wherein selectively storing the progressive signal stream in an odd and even alternative way means to perform the following signal processing step on a consecutive first and second frame signal:

storing only the even scan signals in the first frame signal, and storing only the odd scan signals in the second frame signal.

10. The video signal processing apparatus of claim 1, wherein the video signal processing apparatus is capable of connecting to two different video display apparatuses, and the progressive video signal and the interlace video signal generated by the video signal processing apparatus are transmitted to the two video display apparatuses respectively for video displaying.

11. The video signal processing apparatus of claim 1, wherein the at least one line buffer in the interlace signal generating module comprises a luminance line buffer and N chroma line buffers, where N is a positive integer and depends on the sampling rate of chroma sampling and luminance sampling.

12. A progressive and interlace video signal apparatus, according to a progressive signal stream, for generating both a progressive video signal and a interlace video signal to at least one video display apparatus, the progressive and interlace video signal apparatus comprises:

an interlace video signal generating module, comprising at least one line buffer, for receiving the progressive signal stream and selectively storing the progressive signal stream in an even and odd alternative way to generate an interlace signal stream; and a video encoder, for encoding, according to the video standard of the video display apparatus, the progressive signal stream and the interlace signal stream respectively to be the progressive video signal and the interlace video signal in compliance with the video standard of the video display apparatus;

whereby the video signal processing apparatus provides both the progressive video signal and the interlace video signal to the video display apparatus for video displaying.

13. A method of utilizing an interlace signal generating module to enable a video signal processing apparatus to generate both a progressive video signal and an interlace video signal to at least one video display apparatus, the video signal processing apparatus comprising the interlace signal generating module, comprising at least one line buffer; and a video encoding module for encoding, according to the video standard of the video display apparatus, the progressive signal stream and the interlace signal stream respectively to be the progressive video signal and the interlace video signal in compliance with the video standard of the video display apparatus;

the method comprising the following steps:

before the progressive signal stream has not been encoded by the video encoding module, selectively storing the progressive signal stream in an odd and even alternative way in the interlace video signal generating module; and encoding the progressive signal stream and the interlace signal stream separately to be the progressive video signal and the interlace video signal;

whereby the video signal processing apparatus provides both the progressive video signal and the interlace video signal to the video display apparatus for video display.

14. The method of claim 13, wherein the video signal processing apparatus generates the progressive signal stream, according to video signals transmitted from an external video memory, via a predetermined video processing procedure.

15. The method of claim 13, wherein the video encoding module comprises a progressive video encoder and an interlace video encoder.

16. The method of claim 15, wherein the interlace video encoder further reads out the stored signals at half of the frequency of the progressive signal stream to generate the interlace signal stream.

17. The method of claim 13, wherein the progressive signal stream comprises plural frame signals, and the frame signals comprise plural scan signals.

18. The method of claim 17, wherein selectively storing the progressive signal stream in an odd and even alternative way means to perform the following signal processing step on a consecutive first and second frame signal:

storing only the odd scan signals in the first frame signal, and storing only the even scan signals in the second frame signal.

19. The method of claim 17, wherein selectively storing the progressive signal stream in an odd and even alternative way means to perform the following signal processing step on a consecutive first and second frame signal:

storing only the even scan signals in the first frame signal, and storing only the odd scan signals in the second frame signal.

20. The method of claim 17, wherein the at least one line buffer in the interlace video signal generating module comprises a luminance line buffer and N chroma line buffers, where N is a positive integer and depends on the sampling rate of chroma sampling and luminance sampling.

* * * * *